July 5, 1955  H. ZIEBOLZ ET AL  2,712,184
ELECTRICAL ANALOGUE TRAINING DEVICE
Filed Dec. 31, 1949  2 Sheets-Sheet 1
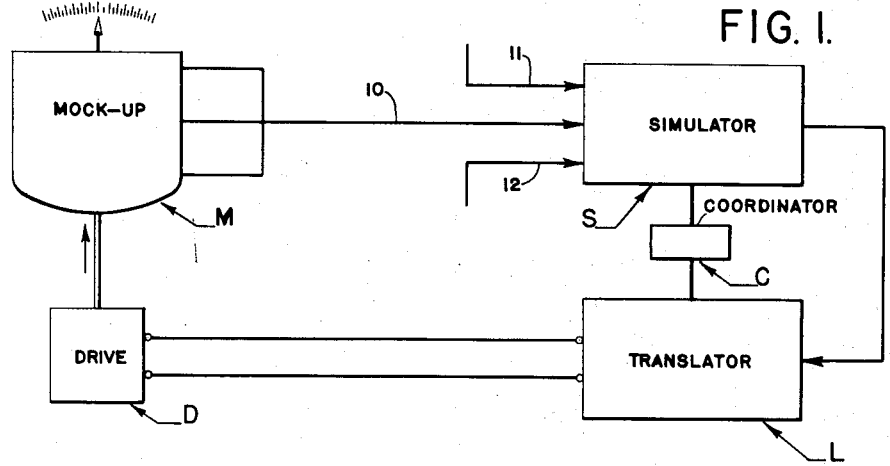
FIG. 1.
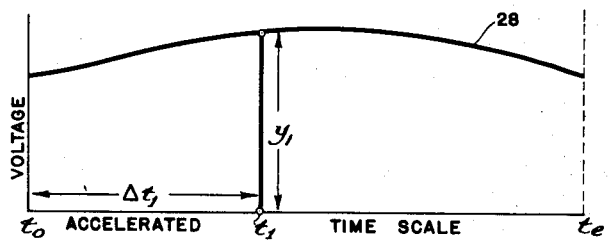
FIG. 3A.
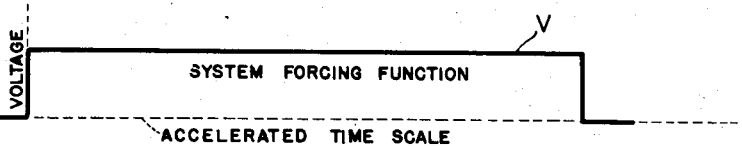
FIG. 3B.
FIG. 3C.
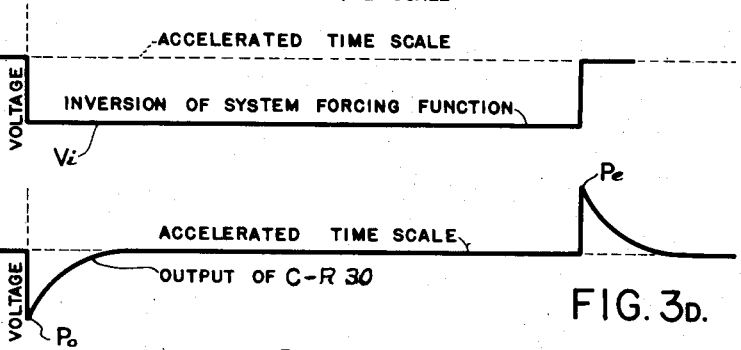
FIG. 3D.
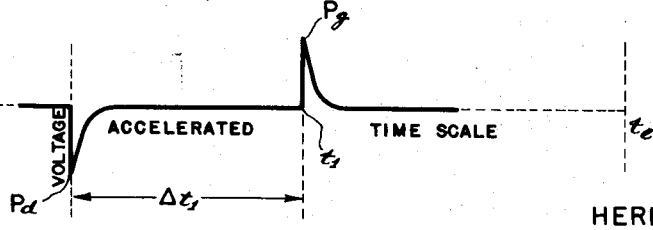
FIG. 3E.
INVENTORS:
HERBERT ZIEBOLZ
MARK E. CAMPBELL
JOHN A. BARING
BY Schroeder, Merriam,
Hofgren & Brady
ATTORNEYS:

INVENTORS:
HERBERT ZIEBOLZ
MARK E. CAMPBELL
JOHN A. BARING
BY: Schroeder, Merriam,
Hofgren & Brady
ATTORNEYS.

United States Patent Office

2,712,184
Patented July 5, 1955

2,712,184
ELECTRICAL ANALOGUE TRAINING DEVICE

Herbert Ziebolz, Chicago, Mark E. Campbell, Park Forest, and John A. Baring, Evanston, Ill., assignors to Askania Regulator Company, a corporation of Illinois Application December 31, 1949, Serial No. 136,272

16 Claims. (Cl. 35—10)

The invention relates generally to a method of and apparatus for acquiring training in the control of a plant, and more particularly for acquiring that training where the space, expense or time requirements make the use of an actual plant for training purposes impractical.

It is acknowledged that there are currently training devices in which a mock-up or substitute for the real plant is employed. (The term "plant" is here used in the broad sense of indicating any operating unit or system the characteristics or attitudes of which change with time, including movable as well as stationary units or systems.) In order, however, that the mock-up or substitute be driven to simulate the operation of the real plant, particularly where the plant is a movable unit such, for example, as a ship, an aeroplane, a submarine, or some other mobile and/or fluid-supported plant, the mechanisms required themselves may become so complicated and so expensive that it becomes uneconomical and impractical to use them. Moreover, as the mechanisms grow in complexity errors creep in due to play in the mechanisms and in the operation of the mechanisms, with the result that the apparatus does not truly simulate the operation of the real plant under similar conditions.

It is a general object of the invention, therefore, to provide a new and improved method and apparatus that can be practiced and constructed at a reasonable cost, can be housed in a comparatively small space, can be built in a short period of time, and can yet be made accurately to simulate operation of the real plant.

A more particular object is to gain this advantage of economy of space, time and cost by simulating the plant and its operation by the employment of electric or electronic circuits and circuit components.

Another object is to provide a training apparatus in which the conditions, factors and forces to which a plant is subjected are converted to parameters which are quickly transmitted, the plant operation simulated on a highly accelerated time scale (thereby permitting the use of the smaller, less expensive, more easily and accurately adapted electronic elements), and the results obtained on the accelerated time scale translated and used to drive a mock-up device on the normal time scale to represent the operations of the plant.

A further object is to provide in a training apparatus, having accelerated-time-scale plant operation simulating means, new and improved means for automatically picking off some value derived in the accelerated operation and translating the same to a slower time scale.

Still another object is to provide a training apparatus having accelerated-time-scale plant operation simulating means repeatedly performing a program of operation simulation, and means for automatically picking up the value of some one or more attitudes at a particular time in the rapidly repeated programs and storing the information thus obtained and converting the same to a normal time scale to be available for the control of a device operating on a normal time scale.

Other objects and advantages will become apparent from the following detailed description taken in connection with the accompanying drawings, in which:

Fig. 1 is a diagrammatic illustration of a generic embodiment of the invention.

Figs. 3a to 3e are graph-like showings illustrating certain portions of the disclosure or the occurrence of certain operation-forcing or triggering functions.

Figure 2:
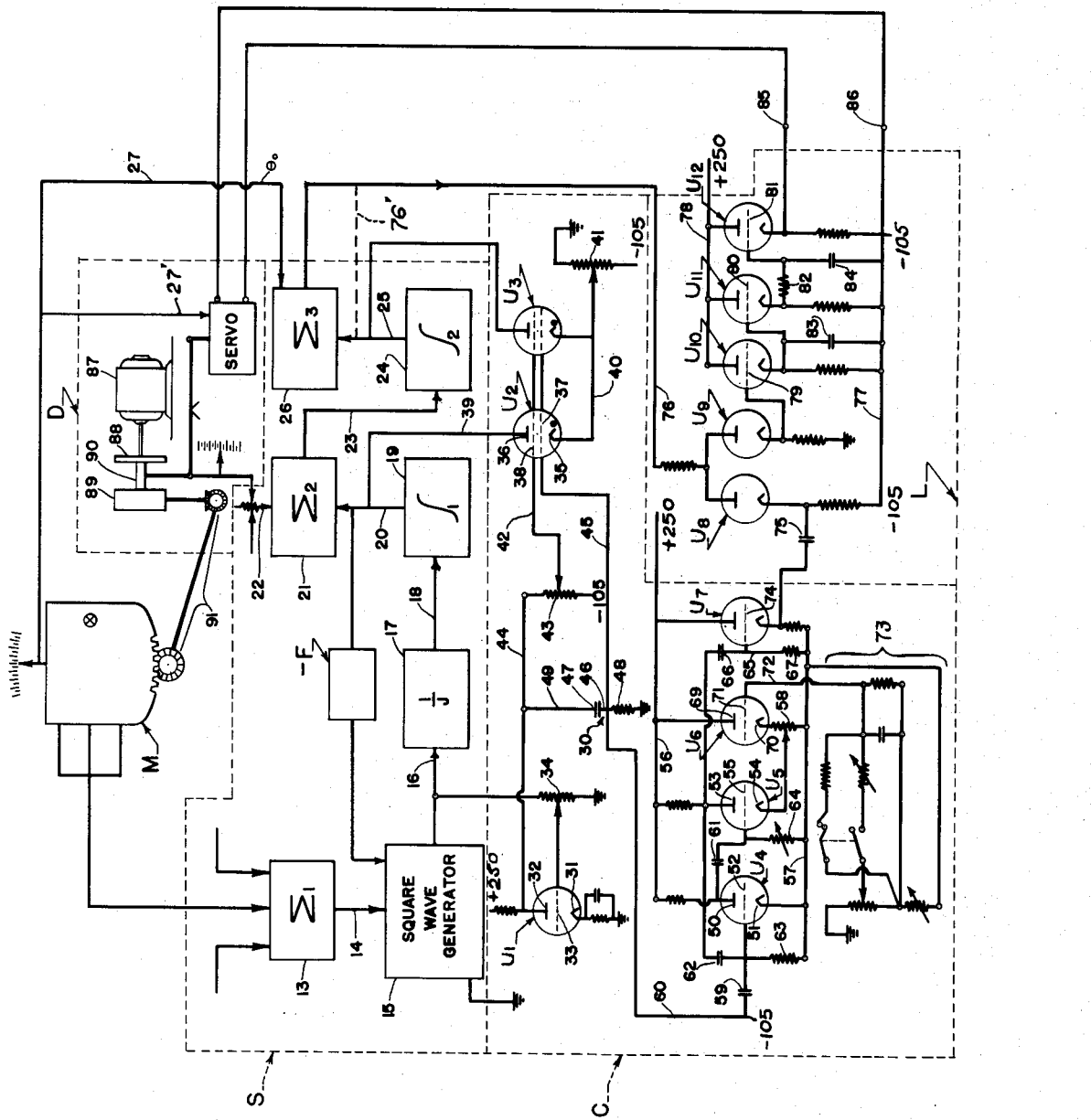
Fig. 2 is a circuit diagram illustrating a particular embodiment of the invention.

The invention is adaptable for the control of a great variety of plants and in a broader concept is disclosed in the copending Ziebolz et al. application Serial No. 196,444, filed November 18, 1950. It will be disclosed herein as adapted to a training method or apparatus. It is not intended, however, that the invention is to be limited thereby to the specific disclosure made. On the contrary, it is intended to cover all modifications, alternative constructions and adaptations falling within the spirit and scope of the invention as defined in the appended claims.

Referring first to Fig. 1 of the drawings, it will be apparent that generically the apparatus for practicing the invention comprises a mock-up or substitute M for the real plant, an accelerated-time-scale simulator S which, as the name suggests, is a means for simulating the operation of the plant on a greatly accelerated time scale, means (for convenience called a translator), herein designated L, serving to pick off desired values from the simulator and translate the same for use on the normal time scale, triggering means C for coordinating the operation of the simulator and translator to obtain a proper feeding-in or sampling of the attitudes, factors or forces and a related taking-out of experienced values, and means D operating under the control of a signal derived from the translator L to drive the mock-up to the same positions that a real plant would have when subjected to the same conditions, forces and factors that have been fed into the simulator S. The mock-up M may take the form of the pilot's cabin of an airplane, of a ship, or the form of some other device that has movement and takes on various positions as a result of adjustment of the controls or reaction to external forces acting on it. Because it is contemplated that programs of accelerated operation will be continually repeated, the mock-up M will be given increments of movement and thus will also take on substantially the same movements as the real plant.

The simulator S is a mechanism such as an analogue computer which, as the name suggests, simulates a real plant or, more particularly, the dynamic operation or transients of the plant. To that end, the simulator S is adapted to be conditioned, that is, to have incorporated therein the attitudes of a real plant as of some particular point in time. These attitudes are here derived from the mock-up or substitute M and are represented as fed or incorporated into the simulator through a connection represented by the arrow 10. These attitudes are created or varied by adjustment of the controls of the mock-up, suggestively represented at 9, since of course the controls will vary greatly depending upon the plant being simulated. In the case of the above suggested embodiment of the mock-up as the cabin of an airplane, these attitudes might be speed of the propeller, angle of the rudder, the angle or position of vanes or flaps, and so forth. Also fed into or incorporated in the simulator S are other conditions, factors or forces, represented by the arrows 11 and 12, to which the real plant will be subjected during a given period of operation (hereinafter termed "program period"). Since the simulator S is designed to follow the same equation as the plant, has incorporated in it the actual attitudes of the plant at some particular time $T_0$, and is subjected to the same additional conditions, factors or forces as the plant, it will, if initiated at the time $T_0$, and if there is no material change in conditions during this "program period," simulate the future operation of the real plant. Thus the simulator actually indicates the status of the plant at any time in the "program period."

To obviate the extensive and complicated mechanisms in the past found necessary to impart the movements and positions of a real plant to a mock-up device, applicants conceived simulating the operation of a plant on a very highly accelerated time scale and of then translating the value or values derived from such accelerated simulation to the normal time scale and to the control of the mock-up device. By simulating the operation on a highly accelerated time scale several advantages are gained. The first of these is that electrical elements and electronic circuits and circuit components can be employed. These occupy comparatively little space, are relatively inexpensive, and changes, substitutions or modifications can readily be made. A second advantage is that a simulator operating on an accelerated time scale predicts the future attitudes or conditions of a plant. This prediction of the future attitudes or conditions is not one based merely on past performance as obtained by the integration of first and higher order derivatives, but the result of the actual carrying out of the performance of the plant through a "program period" having present in simulated form the field of forces and factors to which the plant is exposed during the "program period." In other words, it is not a derivation based on the past only but is, on the contrary, actually experienced and thus may be utilized to control the drive of the mock-up device in a straightforward manner causing it to have the proper conditions and attitudes at the end of an increment of time on the normal time scale corresponding to that on the accelerated time scale.

Referring now more particularly to Fig. 2, the simulator S is composed of a plurality of summarizers, integrators, and multiplicators, each being a composite of electrical elements connected in electronic circuits or circuit components so as to perform in accordance with a desired mathematial equation. These summarizers, integrators, etc. are not per se new but can be purchased on the open market or can be constructed by following known principles. (See volume 21 "Electrical Instruments" of the Radiation Laboratories Series, published by McGraw-Hill in 1948.) These units have, therefore, not been disclosed in detail but have been illustrated diagrammatically by the well known practice of employing a rectangular block and a symbol commonly used to designate the function performed.

Herein the invention is disclosed as adapted for the gaining of training in the control of a vehicle in space or perhaps, more accurately, one supported in a fluid medium. It is recognized that to describe completely a body's position in space six parameters are necessary, that is, three reference axes and the rotation around these reference axes. For the sake of simplicity and since the basic equations and the mechanism for all of the six parameters are the same, the disclosure will be limited to one only of these parameters. Herein the particular attitude or condition that is to be observed is the angular rotation of the vehicle about one of the reference axes and will hereinafter be referred to as the angle $\theta$. Influencing this angular position of the vehicle are its angular position at the time the controls are adjusted, the torques generated by the control means of the vehicle, the torques set up by reactions to movement of the vehicle, possible torques due to acceleration, and so forth.

In accordance with the fundamental Newton equation, the angular acceleration of a body in space $$\left(\frac{d^2\theta}{dt^2}\right)$$

is proportional to the sum of all torques divided by the moment of inertia (J) of the body. This is stated mathematically $$\frac{d^2\theta}{dt^2} = \frac{\text{torque}}{J}$$

Accordingly, the torques, in proper ratio of magnitudes and herein as electrical signals, are fed into a first summarizer 13 with the output of the summarizer 13 fed through a connection represented at 14 to a square wave generator 15 where it modulates the output of the generator. From the square wave generator these signals, now translated into a voltage as the parameter, are fed by way of a conductor 16 to a divider 17 which functions to divide the torque by the moment of inertia of the vehicle to give the second derivative $\ddot{\theta}$, namely, acceleration $$\frac{d^2\theta}{dt^2}$$

as above pointed out. The output of the divider 17 is by a connection 18 fed to a first integrator 19 which by the process of integration gives the first derivative or rate of change in angular position, namely $$\frac{d\theta}{dt}$$

From the integrator 19 a connection 20 transmits the result to a second summarizer 21.

Leading from the integrator 19 back to the generator 15 is a connection ($-F$) so that there may be duly taken into consideration the torques produced by the damping action of the medium in which the vehicle is suspended. Such damping action is usually proportional to the rate of change $$\frac{d\theta}{dt}$$

and this damping factor is commonly designated by the letter F, hence its use as a reference character for the connection described. The negative sign is employed to indicate that damping usually opposes the other torques.

To the summarizer 21 there is also added the rate of angular movement $\dot{\theta}_0$ of the vehicle at the time the "program" is initiated, that is, at the time $T_0$. Hereinafter "T" will be employed to designate points or increments of time on the normal time scale while "t" will designate corresponding points or increments on the accelerated time scale. "$T_0$" and "$t_0$" will represent commencement of the "program period" on their respective time scales and, since the accelerated operation must for proper functioning of the system, commence simultaneously with the commencement of the "program period" on the normal time scale $T_0$ and $t_0$ are "coincident." "$T_e$" and "$t_e$" represent the end of a "program period," and "$T_1$" and "$t_1$" represent a particular point in the "program period" at which the value of an attitude or characteristic is to be determined. Since the end results of the formulae here dealt with are $\theta$ or $\Delta\theta$, T and $t$ are normally interchangeable. The value $\dot{\theta}_0$ is introduced because the change in angular position $\Delta\theta$ in the interval $\Delta t_1$ (see Figs. 3a–3e) is $$\int_{t_0}^{t_1}\left[\int \frac{d^2\theta}{dt^2}dt\right]dt + \int_{t_0}^{t_1}\frac{d\theta}{dt}dt$$

This factor is here represented by the arrow 22 and is obtained directly from the drive, later described in greater particularity, of the mock-up M whose speed adjustment corresponds to the rate of change in angular position of the vehicle for it is being so driven under the control of the translator L and the drive means D. The summarized rate of change inputs of summarizer 21 are by a connection 23 fed to a second integrator 24 whose output is change in angular position, that is, $\Delta\theta$. Depending on the nature of the terminal result desired and on the nature of the drive means D, the integrator 24 may be the last unit of the simulator. If, however, the result desired is the actual value $\theta$, the output of the integrator 24 may, as here, be fed by a connection 25 into a third summarizer 26. Also fed into this summarizer is the angular position $\theta_0$ of the vehicle at the start of the "program period," that is, at the time $T_0$. It is represented in Fig. 2 by an arrow 27 and is added because the final position is $$\theta_0 + \int_{t_0}^{t_1} \left[ \int \frac{d^2\theta}{dt^2} dt \right] + \int_{t_0}^{t_1} \frac{d\theta}{dt} dt$$

The output of this summarizer 26 is then the result sought, namely, the actual value of $\theta$ at the time $t_1$.

It will be appreciated, of course, that for different attitudes or for the same attitude of a different plant, the units, that is, integrators, summarizers, etc. that go to make up the simulator, will vary as to number or arrangement or both. Whatever the arrangement may be, however, and whatever the attitude to be observed, the simulator can be made to produce a voltage varying in time as the attitude of the real plant varies. This voltage may be represented by the trace 28 in Fig. 3a wherein the abscissa axis represents time on an accelerated time scale and the ordinate axis represents voltage.

As has already been stated, the parameter arbitrarily chosen to express the attitudes, factors and forces of and acting on the vehicle is voltage. This voltage is herein caused to have a square wave form, as represented at V in an exaggerated manner in Fig. 3b, as fed into the divider 17. Application of the voltage initiates operation of the units of the simulator and the end of the square wave tends to terminate operation of the simulator. The duration of the square wave V thus determines the duration of the "program period" while the amplitude of the square wave is a measure of the magnitude of the values being fed into the simulator at the square wave generator 15. The square wave thus exercises basic control over the operation of the simulator and, as will hereinafter be made known, also over the translator, and will hereinafter be referred to as the system-forcing function.

Exercising immediate control is the triggering means C, which, as above stated, coordinates the operation of the simulator and the translator to obtain a proper feeding-in or sampling of the attitudes, factors or forces and a related taking-out of experienced values. In order that residual voltages or stray voltages may not cause operation, particularly of the integrators, after the square wave V has returned to zero, the triggering means C functions, among other ways, to remove any residual values, herein voltages, from the output of the integrators 19 and 24. The triggering means C comprises a first grid-controlled vacuum tube U1 which functions as a wave inverter, a resistor-condenser differentiating unit 30, and a gas-filled tube for each integrator, herein tubes U2 and U3. The cathode 31 of the tube U1 is connected to ground, the plate 32 is connected to a positive voltage source of a comparatively high value, on the order, for example, of 250-volts, and the grid 33 is connected to a voltage divider 34 one end of which is connected to ground, the other end of which is connected to the connection 16 so that the square wave V is impressed upon it. As a result, the tube U1 will function in well known manner to produce an inverted square wave Vi coincident with the square wave V.

The thyratrons U2 and U3 are connected in parallel and it will be appreciated that their number could be increased were there additional integrators or other units in the simulator whose outputs were to be restored to zero. Inasmuch as the thyratrons are in parallel and operate the same, the connections and operation of but one of the tubes will be described. Taking tube U2, it has a cathode 35, a plate 36, a control grid 37 and a shield grid 38. The plate 36 is by a lead 39 connected to the output of integrator 19, that is, to the connection 20, and the cathode 35 is by a lead 40 connected to a negative potential source 41. Herein the cathode is given a potential of about a minus 10-volts which approximates the voltage drop through the tube when the tube is broken down. In this way, the plate 36 and hence the output of the integrator 19 will be at approximately zero or ground potential when the tube U2 is broken down. The shield grid 38 is by a lead 42 connected to a second voltage divider 43, one end of which is also connected to a negative potential of about 105-volts while the other end is by a lead 44 connected to the plate 32 of the tube U1. The control grid 37 is by a lead 45 connected to the juncture point 46 between a condenser 47 and a resistor 48 composing the resistor-condenser differentiating unit 30. The remaining side of the condenser 47 is by a lead 49 connected to the lead 44, while the resistor 48 is connected to ground.

The operation of the signal pulse-forming portion, just described, of the triggering means C is as follows: With the sharp rise in voltage of the square wave V, there is a corresponding voltage impressed across the divider 34 thereby biasing the grid 33 sharply positive and increasing the flow of current through the tube U1 with a corresponding drop in plate voltage as shown in Fig. 3c. This reduction in plate voltage is transmitted to the R-C differentiating unit 30 and thus produces at the juncture point 46 a sharp negative pulse $P_0$ as shown in Fig. 3d, this pulse of course being coincident with the commencement of the square wave V and hence with the time $t_0$. This negative pulse is by lead 45 impressed on the control grid 37 of the thyratron U2 and extinguishes the tube. Grid 38 is also made negative and thus aids in arresting operation of the tube. With the tube U2 no longer conductive, the output of the integrator 19 is no longer held at zero but is fed to the summarizer 21.

At the end of the "program period," that is, at the time $t_e$, the square wave V drops suddenly to zero. This has the reverse effect on the tube U1 and on the R-C differentiating unit 30 from that just described, with the result that there is a positive pulse $P_e$. This is now applied to the control grid 37 of the tube U2. Simultaneously the voltage of the plate 32 rises sharply, thereby causing lead 42 to take from the voltage divider 43 a positive rather than a negative voltage which is impressed on the shield grid 38. With both grids now positive, the tube U2 breaks down and commences to fire. While the positive pulse $P_e$ is merely a pulse, the tube continues to fire until the next negative pulse despite the disappearance of the positive pulse because of the character of the tube and the fact that the shield grid 38 remains positive until the commencement of the next square wave V. With the tube U2 broken down, its plate 36 will, for the reasons previously described, be at substantially zero potential and likewise the connection 20 leading from integrator 19 to summarizer 21 will be at zero potential.

It will be appreciated that the "program period" on the accelerated time scale and utilizing electronic circuit components can be and herein is in the order of milliseconds. Thus, while the simulator gives the value $\theta$, it is of no utility until it can be captured and usually until it can be translated to a slower or normal time scale of the plant to be represented. Moreover, since it is not always the value of the attitude at the end of the "program period" that is desired, a training apparatus in order to be satisfactory must be capable of picking off the voltage value at any point in the "program period," for example, at the point ($t_1$) which occurs an increment of time $\Delta t_1$ after ($t_0$).

To that end, the translator L is provided and is herein designed not only to be capable of picking off a voltage value at any time in the "program period," but also of storing that value and translating the repeated fleeting values so obtained to a slower time scale utilizable to control the drive of the mock-up M. Hence the translator comprises, generally speaking, means for picking off the voltage value from the simulator (sampling circuit) and storing means. In order that the translator L may function to pick off a voltage value at a particular time in the "program period," it is keyed to and triggered by the system-forcing function of the simulator, more particularly, the negative pulse $P_0$ of the differentiating unit 30. Forming a portion of the triggering means and responsive to the system-forcing function is a gate pulse generating means.

The gate pulse generating means is composed of what is commonly referred to as a multi-vibrator and comprises a pair of grid controlled tubes U4 and U5, the tube U4 having a plate 50, a cathode 51, and a grid 52. Tube U5 similarly has a plate 53, a cathode 54 and a grid 55. Both plates are connected to a comparatively high positive potential represented at 56, and the cathode 51 is connected to a negative potential something less than half the value of the positive potential which is here represented at 57. Cathode 54 is connected to the negative potential 57 through a voltage divider 58 which will presently be described in greater detail. The grid 52 is through a condenser 59 and a lead 60 connected to the juncture point 46 of the differentiating means 30, while grid 55 is through a condenser 61 connected to the plate 50 of the tube U4. The grid 52 is in turn also connected to the plate 53 through a condenser 62. Resistances 63 and 64 are connected, respectively, between the grids 52 and 55 and the negative potential 57 with resistance 64 being variable. Completing the principal portion of the gate pulse generating means is an R-C differentiating means, generally designated 65, composed of a condenser 66, one plate of which is connected to the plate 53, and a resistor 67 connected at one end to the remaining plate of the condenser and at the other end to the negative potential 57.

The tube U4 is biased so as to be normally conductive. Thus when the negative pulse $P_0$ is applied to the grid 52 the tube becomes less conductive with a corresponding increase in the plate voltage. This increase is through condenser 61 transmitted to grid 55 of the tube U5 causing that tube which is normally nonconductive to become conductive. The resulting drop in plate voltage of the tube U5 is then through condenser 62 applied to grid 52 thereby driving the tube U4 further toward cut-off. This in turn further affects tube U5, as above described, with the result that there is a very decided drop in the plate voltage of the tube U5 at the time $t_0$. This drop applied to the differentiating means 65 produces a sharp negative pulse $P_d$ (see Fig. 3e).

As the positive charge on the grid 55 leaks off through the resistance 64, the grid returns to its cut-off value. When it reaches cut-off value a sudden return of the circuit just described to its original state occurs through the inverse of the process above set forth. This means a sudden rise in voltage and when differentiated by the R-C means 65 a positive pulse is obtained. This pulse is represented as $P_g$ in Fig. 3e and is herein termed the gate pulse because it determines the time of pick-off of the voltage value from the simulator and triggers the operation of the sampling means. This pulse occurs at the time $t_1$ in the "program period," that is, an increment of time $\Delta t_1$ after $t_0$. The time delay between pulse $P_d$ and $P_g$ is determined by the time constant of the condenser 61 and the resistor 64 and the bias on the tube U5.

In order to vary the time of occurrence of the gate pulse $P_g$, tube U6 is provided and is so connected in circuit as to vary the bias of the tube U5 which, as above stated, is one of the factors influencing the return of the tube U5 to cutoff, nonconducting condition. The plate 69 of the tube U6 is connected to the positive potential 56 while the cathode 70 is connected to the negative potential 57 through voltage divider 58 to which the cathode 54 of the tube U5 is connected. The grid 71 of the tube U6 is by a lead 72 connected to means, generally designated 73, of well known construction and operating in well known manner to vary the bias of the tube U6 thereby in turn varying the flow of current through the divider 58 and hence the voltage on the cathode 54.

The output of this gate pulse generating means is preferably amplified by the tube U7 whose grid 74 is connected to the juncture point between the components of the differentiating means 65. From the tube U7 the gate pulse $P_g$ is through a condenser 75 applied to the sampling circuit to trigger the operation thereof.

The sampling or pick-off means comprises a pair of tubes U8 and U9 the plates of which are connected by a common lead 76 to the output of the simulator which herein is that of the last summarizer 26. The cathode of the tube U8 is connected to a negative potential represented at 77 and is also connected, as already stated, to the cathode of the tube U7 through condenser 75. The cathode of the tube U9 is connected to ground. The tube U8 is normally so biased that it conducts enough current to bring the plate of tube U9 negative relative to its cathode thereby cutting off operation of tube U9. When the positive gate pulse $P_g$ is impressed on the cathode of tube U8, its potential is raised above that of its plate and thus tube U8 ceases to conduct for the duration of the pulse. This then raises the potential of the plate of tube U9 causing it to conduct for that brief interval and to pick off the value determined by the simulator at the time $t_1$.

This momentary value picked up by tube U9 from the simulator is transmittetd to the storing means which comprises three tubes U10, U11 and U12, the plates of which are all connected to a common positive potential indicated at 78 and the cathodes of which are all connected to the negative potential 77. The grid 79 of the tube U10 is connected to the cathode of tube U9 while the grid 80 of the tube U11 is connected to the cathode of tube U10, and the grid 81 of the tube U12 is connected through a resistance 82 to the cathode of the tube U11. The grid 80 of tube U11 and the cathode of tube U10 are additionaly connected to the negative potential 77 through a condenser 83, and the grid 81 of tube U12 is similarly connected through a condenser 84. With the circuit arranged as described, there is stored on the condenser 83 a charge which constitutes a measure of the voltage output of the summarizer 26 at the time $t_1$. Tube U10 then in turn controls tube U11 to store on condenser 84 a charge proportional to the voltage value derived from the simulator. The combination of condensers 83 and 84 and resistor 82 in conjunction with the operation of tubes U10 and U11, serves to filter out undesirable high-frequency components introduced by the nature of the operation of tube U9. The voltage communicated to the grid 81 of tube U12 is therefore a smoothly varying voltage which at all times is a measure of the output of the simulator. Tube U12 then presents a high impedance load to the condenser 84 and causes the output voltage to appear at a low impedance level between the terminals 85 and 86. Inasmuch as the operation is repeated continuously and at milli-second intervals, the value at the time $t_1$ appears at the terminals not as a very brief value but as a continuous value, hence it is available for reference at any time.

Having thus obtained a usable indication or measure of what the angular position $\theta_1$ of the mock-up is to be at a time $T_1$ on the real or normal time scale corresponding to the time $t_1$, it is a comparatively simple matter to provide mechanism that will function so to drive the mock-up that at the end of a real period of time corresponding to the increment $\Delta t_1$ on the accelerated time scale the mock-up will be in the position predicted by the simulator. While the ultimate $\theta_1$ was used by way of example above, it is obvious that change in angular position $\Delta \theta$ might equally well be employed. By way of very crude example, the variable speed drive could comprise simply a variable speed transmission including an electric motor 87, a disk 88 driven thereby, a cylinder 89, and an idler wheel 90 interposed in well known manner between the disk and the cylinder and shiftable axially of the cylinder and diametrically of the disk to vary the rate of transmission of rotation of the disk 88 to the cylinder 89. The cylinder could be connected to the mock-up through any suitable gearing, indicated generally at 91, and a servo means might well be employed to convert the electrical value or signal obtained from the terminals 85 and 86 into appropriate operation of the variable speed drive. Where the value taken from the simulator S is actual angular position of the plant, some provision would have to be made whereby the servo and associated drive means would take into consideration the initial angular position, namely, $\theta_0$. This is here symbolically shown by the arrow 27' which, like the arrow 27, is shown associated with the mock-up to feed into the servo or the summarizer 26 the initial angular position $\theta_0$.

If it is desired to follow the above mentioned alternative of utilizing the angular change $\Delta\theta$, then the sampling circuit must be connected to the output 25 of the integrator 24 as by means of the broken line connection 76'. It will be appreciated, of course, that under these circumstances $\theta_0$ is not fed into either the summarizer 26 or the servo and, of course, the sampling circuit is disconnected from the summarizer 26. Since mechanical means are here involved, it is not likely that the servo would have an infinitely fast time constant and thus a correction taking the time constant into consideration would have to be made, all as well known in the art.

We claim as our invention:

1. An apparatus for gaining training in the control of a plant comprising, in combination, a mock-up of the plant; a simulator of the dynamic operation of the plant, in respect of at least one attitude, adapted to have fed into it and be subject to the same values of current attitudes, factors and forces as the plant and functioning when so conditioned to simulate operation of the plant during a given program period, said simulator operating on a time scale accelerated with respect to the time scale of operation of the plant and of said mock-up, triggering means interconnected with said simulator to initiate operation of said simulating means to initiate a program period and to remove residual values upon termination of a program period, means obtaining from said simulating means the value of the attitude at some predetermined point of time during the program period and translating the same to a signal employable on the time scale of operation of said mock-up, and a variable drive for said mock-up including means adapted to receive and to be responsive to said signal, said variable drive operating when under the control of said signal only so to drive said mock-up as to cause the same to exhibit the same value of the attitude experienced in the simulated operation when the predetermined point of time is reached on the time scale of operation of said mock-up.

2. An apparatus for gaining training in the control of a plant comprising, in combination, a mock-up of the plant; a simulator of the dynamic operation of the plant, in respect of at least one attitude, adapted to have fed into it and be subject to the same values of current attitudes, factors and forces as the plant and functioning when so conditioned to simulate operation of the plant during a given program period, said simulator operating on a time scale accelerated with respect to the time scale of operation of the plant and of said mock-up, means obtaining from said simulating means the value of the attitude at some predetermined point of time during the program period and translating the same to a signal employable on the time scale of operation of said mock-up, triggering means coordinating the operation of said simulating means and of said value obtaining and translating means, said last named means being adjustable to vary the point of time in the program period at which the value of the attitude is obtained, a variable drive for said mock-up, and means adapted to receive and to be responsive to said signal controlling said variable drive to cause said mock-up to exhibit the same value of the attitude experienced in the simulated operation when the predetermined point of time is reached on the time scale of operation of said mock-up.

3. An apparatus for gaining training in the control of a plant comprising, in combination, a mock-up of the plant, an electronic analogue of the plant adapted, when subjected to the same forces and factors and when having incorporated therein the same values of attitudes as the plant, to simulate operation of the plant during a given program period and on a time scale accelerated relative to that of the plant and of said mock-up in respect of at least one attitude of the plant, means obtaining from said analogue the value of the attitude at some predetermined point of time during the program period and translating the same to a signal employable on the time scale of operation of said mock-up, and a variable drive for said mock-up including a servo mechanism adapted to receive and to be responsive to said signal, said variable drive operating when under the control of said signal only so to drive said mock-up as to cause the same to exhibit the same value of the attitude derived from the analogue when the predetermined point of time is reached on the time scale of opration of said mock-up.

4. An apparatus for gaining training in the control of a plant comprising, in combination, a mock-up of the plant, means adapted, when subjected to the same forces and factors and when having incorporated therein the same values of attitude as the plant, to simulate the operation of the plant during a given program period, said simulating means completing a program period in a fraction of the time required for the plant to complete a program period, means for obtaining from said simulating means the value of an attitude at some predetermined point of time within the program period and translating the same to a signal employable on the time scale of operation of said mock-up, a variable drive for said mock-up including means adapted to receive and to be responsive to said signal operating under the control thereof so to drive said mock-up that it would exhibit the same value of the attitude experienced in the simulated operation when driven without interference until the predetermined point on the time scale of operation of said mock-up is reached, and means for repeating the simulated operation with then current forces, factors and values of attitudes at periodic intervals.

5. An apparatus for gaining training in the control of a plant comprising, in combination, a mock-up of the plant, means adapted, when subjected to the same forces and factors and when having incorporated therein the same values of attitude as the plant, to simulate the operation of the plant during a given program period, said simulating means completing a program period in a fraction of the time required for the plant to complete a program period, means for obtaining from said simulating means the value of an attitude at some predetermined point of time within the program period and translating the same to a signal employable on the time scale of operation of said mock-up, a variable drive for said mock-up including means adapted to receive and to be responsive to said signal operating under the control thereof so to drive said mock-up that it would exhibit the same value of the attitude experienced in the simulated operation when driven without interference until the predetermined point on the time scale of operation of said mock-up is reached, and means for repeating the simulated operation with then current values of forces, factors and attitudes at periodic intervals longer than the actual time of a program period of said simulating means and shorter than the program period of the plant.

6. An apparatus for gaining training in the control of a plant comprising, in combination, a mock-up of the plant, a simulator of the dynamic operation of the plant, in respect of at least one attitude, adapted to have fed into it and be subject to the same values of current attitudes, factors and forces as the plant and functioning when so conditioned to simulate operation of the plant during a given program period, said simulator operating on a time scale accelerated with respect to the time scale of operation of the plant and of said mock-up and including a generator producing a continuously and frequently recurring signal, triggering means subjected to the signal of said generator and interconnected with said simulator to initiate operation of said simulating means with each recurrence of the signal and to remove residual values upon termination of the signal, means under the control of said triggering means for obtaining from each operation of said simulating means the value of an attitude at a predetermined point of time within the program period and translating the same to a signal employable on the time scale of operation of said mock-up, and a variable drive for said mock-up operating under the control of said signal to drive said mock-up during the interval between recurrence of said predetermined point of time in successive program periods of said simulating means at a rate called for by said signal.

7. An apparatus for gaining training in the control of a plant comprising, in combination, a mock-up of the plant, a simulator of the dynamic operation of the plant, in respect of at least one attitude, adapted to have fed into it and be subject to the same values of current attitudes, factors and forces as the plant and functioning when so conditioned to simulate operation of the plant during a given program period, said simulator operating on a time scale accelerated with respect to the time scale of operation of the plant and of said mock-up and including a generator producing a continuously and frequently recurring signal, triggering means subjected to the signal of said generator and interconnected with said simulator to initiate operation of said simulating means with each recurrence of the signal and to remove residual values upon termination of the signal, means under the control of said triggering means for obtaining from each operation of said simulating means the value of an attitude at a predetermined point of time within the program period, means for storing the values so obtained and translating the same into a continuous signal employable on the time scale of operation of said mock-up, and a variable drive for said mock-up operating under the control of said signal to drive the same in accordance with said signal.

8. An apparatus for gaining training in the control of a plant comprising, in combination, a mock-up of the plant, a simulator of the dynamic operation of the plant, in respect of at least one attitude, adapted to have fed into it and be subject to the same values of current attitudes, factors and forces as the plant and functioning when so conditioned to simulate operation of the plant during a given program period, said simulator operating on a time scale accelerated with respect to the time scale of operation of the plant and of said mock-up so as actually to experience, during the accelerated program period, the value of an observed attitude at a future point in time, means operable to pick-off from said simulator the experienced value of an attitude being observed at a point in the accelerated program period corresponding to said point of time in the future, means coordinating the operation of said simulator and of said pick-off means including means functioning at predetermined frequency to initiate operation of the simulator, means for storing the value derived from said simulator during each accelerated program period to translate the value derived from said simulator into a signal of a duration capable of use on a normal time scale, and a variable drive for said mock-up operating under the control of said signal so to drive said mock-up that should the point of time in the future be reached said mock-up would exhibit the same value of observed attitude as the last value taken from said simulator.

9. An apparatus for gaining training in the control of a plant comprising, in combination, a mock-up of the plant, an analogue of the plant composed of electronic calculating devices adapted to have applied thereto the same values of current attitudes, factors and forces as the plant and functioning when so conditioned to simulate the operation of the plant, in respect of at least one attitude, during a given program period, a sampling means operable to obtain from said analogue the value of an observed attitude at some predetermined point of time within the program period, coordinating means for said analogue and said sampling means determining the beginning and the end of the program period of said analogue and the time of operation of said sampling means, means for storing the values picked off by said sampling means and translating the same into a continuous signal for use on a normal time scale, and a variable drive for said mock-up governed by said signal.

10. An apparatus for gaining training in the control of a plant comprising, in combination, a mock-up of the plant, an analogue of the plant, said analogue being composed of electronic elements for operation on an accelerated time scale relative to the plant and said mock-up, a sampling circuit electrically coupled with said analogue operable at a predetermined point in the program period of said analogue to pick off the value of the attitude being simulated, coordinating means for said analogue and said sampling circuit including a first circuit initiating and terminating the program period of said analogue and a second circuit governing the time of operation of said sampling circuit, said coordinating means functioning at a predetermined frequency, a storing circuit receiving the repeated brief values picked up by said sampling circuit and translating the same into a continuous signal output on the time scale of operation of said mock-up, and a variable drive for said mock-up governed by said signal.

11. An apparatus for gaining training in the control of a plant comprising, in combination, a mock-up of the plant, an analogue of the plant composed of electronic elements and adapted, when subject to the same forces and factors and when having incorporated therein the same values of attitude of the plant, to simulate the operation of the plant, in respect of at least one attitude, during a given program period, a sampling circuit electrically coupled with said analogue operable at a predetermined point in the program period of asid analogue to pick off the value of the attitude being simulated, coordinating means governing the operation of said analogue and said sampling circuit including a first pulse generating circuit signaling the commencement and the end of the program period of said analogue and a second pulse generating circuit triggering the operation of said sampling circuit, means generating a periodically recurring system-forcing function exercising over-all control over said analogue and said coordinating means, means for storing the values picked off from said analogue by said sampling circuit during repetitions of the program period by said analogue and translating the same into a continuous signal usable on the time scale of operation of said mock-up, and a variable drive for said mock-up governed by said signal.

12. An apparatus for gaining training in the control of a plant comprising, in combination, a mock-up of the plant, an electronic analogue of the plant including a square wave generator whose output serves as the forcing function of the analogue, a sampling circuit electrically connected to said analogue at a point where the analogue produces that character of value of an attitude desired to be known, means coordinating the operation of said analogue and said sampling circuit including a first pulse generating circuit connected to be influenced by the output of said square wave generator and comprising at least one electronic valve device connected to said analogue at an intermediate point and functioning at periodic intervals to remove any residual values from that portion of said analogue and pulse generating means producing a pulse rendering said electronic valve device effective to remove residual values thereby terminating a program period of said analogue, and a second circuit comprising a pulse generating means connected to and governing said sampling circuit rendering the same operative at a predetermined point in the program period to pick off from said analogue the value of the attitude being observed, means for storing the values picked off from said analogue by said sampling circuit during repetitions of the program period by said analogue and translating the same into a continuous signal usable on the time scale of operation of said mock-up, and a variable drive for said mock-up governed by said signal.

13. In an apparatus for gaining training in the control of a plant, an analogue of the plant composed of electronic elements adapted to be subjected to and have incorporated therein the same forces and factors and the same values of attitude as the plant and responding to such applied values, to simulate the operation of the plant, in respect of at least one attitude, during a given program period, a sampling circuit electrically connected to said analogue operable to obtain from said analogue the value of an observed attitude at a predetermined point of time within the program period, coordinating means for said analogue and said sampling circuit determining the beginning and the end of the program period of said analogue and the time of operation of said sampling circuit, said analogue including a device generating a periodically recurring function exercising general control over said coordinating means, and electrical means for storing the values picked off by said sampling circuit and translating the same into a continuous signal.

14. In an apparatus for gaining training in the control of a plant, an electronic analogue of the plant including a device for generating a periodically recurring system-forcing function exercising general control, said analogue being adapted, to be subjected to and to have incorporated therein the same forces and factors and the same values of attitude as the plant and responding to such applied values, to simulate the operation of the plant, in respect of at least one attitude, during a given program period, a sampling circuit electrically coupled with said analogue operable at a predetermined point in the program period of said analogue to pick off the value of the attitude being simulated, coordinating means for the operation of said analogue and said sampling circuit including a first pulse generating circuit connected to be influenced by the system forcing function and comprising at least one electronic valve device connected to said analogue at an intermediate point and functioning at periodic intervals to restore said analogue at that point to a neutral condition and pulse generating means producing a pulse rendering said electronic valve device effective to restore said analogue to neutral thereby terminating a program period of said analogue, and a second circuit comprising a pulse generating means connected to and governing said sampling circuit rendering the same operative to pick off from said analogue the value of the attitude being observed, and means for storing the values picked off from said analogue by said sampling circuit and translating the same into a continuous signal.

15. In an apparatus for gaining training in the control of a plant, an electronic analogue of the plant including a device for generating a periodically recurring system-forcing function exercising general control, said analogue being adapted, to be subjected to and to have incorporated therein the same forces and factors and the same values of attitude as the plant and responding to such applied values, to simulate the operation of the plant, in respect of at least one attitude, during a given program period, a sampling circuit electrically coupled with said analogue operable at a predetermined point in the program period of said analogue to pick off the value of the attitude being simulated, coordinating means for the operation of said analogue and said sampling circuit including a first pulse generating circuit connected to be influenced by the system-forcing function and comprising at least one electronic valve device connected to said analogue at an intermediate point and functioning at periodic intervals to restore said analogue at that point to a neutral condition and pulse generating means producing a pulse rendering said electronic valve device effective to restore said analogue to neutral thereby terminating a program period of said analogue, and a second circuit comprising a pulse generating means connected to and governing said sampling circuit rendering the same operative to pick off from said analogue the value of the attitude being observed and means adjustable to vary the time of occurrence of the pulse generated by said second circuit, and means for storing the values picked off from said analogue by said sampling circuit and translating the same into a continuous signal.

16. In an apparatus for gaining training in the control of a plant, an analogue of the plant composed of electronic calculating units and including at least one integrator, said analogue being adapted, to be subjected to and to have incorporated therein the same forces and factors and the same values of attitude as the plant and responding to such applied values, to simulate the operation of the plant, in respect of at least one attitude, during a given program period, a sampling circuit electrically coupled with said analogue operable when so conditioned to pick off the value of the attitude being simulated, coordinating means for the operation of said analogue and said sampling circuit including a first pulse generating circuit comprising an electronic valve device connected to said analogue immediately behind the integrator thereof and functioning when properly conditioned to restore the output of the integrator to zero thereby terminating a program period of said analogue and pulse generating means producing a pulse for rendering said electronic valve device effective to restore the output of the integrator to zero, and a pulse for rendering said electronic valve device ineffective for that purpose to initiate a program period, and a second circuit comprising a pulse generating means connected to and governing said sampling circuit rendering the same operative at a predetermined point in the program period to pick off from said analogue the value of the attitude being observed, a device for feeding values into said analogue and generating a periodically recurring system-forcing function exercising general control over said coordinating means, and electronic means for storing the values picked off from said analogue by said sampling circuit and translating the same into a continuous signal.

References Cited in the file of this patent

UNITED STATES PATENTS

| Number | Name | Date |
|---|---|---|
| 2,451,044 | Pierce | Oct. 12, 1948 |
| 2,470,434 | Eckman | May 17, 1949 |
| 2,470,468 | Buchanan | May 17, 1949 |
| 2,503,213 | Philbrick | Apr. 4, 1950 |
| 2,553,526 | Chapple | May 15, 1951 |
| 2,557,954 | Durheim | June 26, 1951 |
| 2,578,299 | Harrison | Dec. 11, 1951 |
| 2,582,474 | Bomberger | Jan. 15, 1952 |
| 2,600,159 | Ergen | June 10, 1952 |